United States Patent
Rappel et al.

(10) Patent No.: US 7,593,192 B1
(45) Date of Patent: Sep. 22, 2009

(54) RAMP ARRANGEMENTS FOR A DISK DRIVE AND METHOD

(76) Inventors: Brian L. Rappel, 1043 Kiowa Rd., Lyons, CO (US) 80540; Chad A. Bogacz, 13900 Lake Song La., B3, Broomfield, CO (US) 80020; David D. Brause, 1373 Clemson Dr., Longmont, CO (US) 80503

( * ) Notice: Subject to any disclaimer, the term of this patent is extended or adjusted under 35 U.S.C. 154(b) by 577 days.

(21) Appl. No.: 11/385,955

(22) Filed: Mar. 20, 2006

(51) Int. Cl.
 *G11B 5/54* (2006.01)
(52) U.S. Cl. ..................................... 360/255
(58) Field of Classification Search ............ 360/254.7, 360/254.8, 254.9, 255
 See application file for complete search history.

(56) References Cited

U.S. PATENT DOCUMENTS

| | | | |
|---|---|---|---|
| 4,933,785 A | * | 6/1990 | Morehouse et al. ...... 360/78.04 |
| 5,404,257 A | | 4/1995 | Alt |
| 6,791,799 B2 | | 9/2004 | Fletcher |
| 7,106,541 B2 | | 9/2006 | Bruner et al. |

* cited by examiner

Primary Examiner—David D Davis
(74) Attorney, Agent, or Firm—Workman Nydegger

(57) ABSTRACT

A digital storage apparatus includes a housing defining a housing interior and defining a ramp support surface. A disk is supported for rotation in the housing. A head gimbal assembly is supported for use in pivotally accessing the disk in performing one or more data accesses and for moving to an unloaded position from an access position. A ramp arrangement receives the head gimbal assembly in the unloaded position. The ramp arrangement includes at least three feet for sliding engagement with the ramp support surface for use in at least partially establishing an operational position of the ramp arrangement. In one aspect, the housing defines a first surface and a second surface, which are in a transverse relationship with respect to one another. The ramp arrangement engages the first surface and the second surface for establishing an operational position of the ramp arrangement in the housing interior.

25 Claims, 4 Drawing Sheets

RAMP ARRANGEMENTS FOR A DISK DRIVE AND METHOD

BACKGROUND

The present invention is directed generally to the field of disk drives and, more particularly, to a ramp arrangement for use as part of a disk drive and method.

Hard disk drives are a well-known form of digital storage arrangement using at least one disk that is supported for rotation. An actuator arrangement generally provides for pivotal movement of one or more transducers for use in performing data accesses using the rotating disk. Hard disk drives are susceptible to operational problems when the head or heads contact the disk, for example, as a result of reception of a mechanical shock. In the absence of rotation of the media, head to disk contact is sometimes catastrophic, since the slider which supports the heads can become stuck to the disk; relative movement can thereafter tear the head(s) from the actuator arm.

In view of the foregoing, the prior art contains a number of approaches for moving the heads to an unloaded position, out of contact with a data surface of the disk, for example, when the disk is rotating slower than normal, not rotating or no data accesses are anticipated. One arrangement for parking the head arrangement is described in U.S. Pat. No. 4,933,785 issued to Morehouse et al (hereinafter Morehouse). The latter describes a ramp configuration wherein the head arrangement is unloaded as a lift tab rides against a ramp and is, thereafter, seated in some sort of detent that is formed in the ramp. This form of hard disk drive can be generally referred to as a load/unload drive. While the Morehouse ramp was generally effective for its intended purposes, more recent developments have necessitated improvements. In particular, there remains a need for a ramp arrangement which is appropriate for use in smaller form factor drives.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In one aspect of the disclosure, a digital data storage apparatus includes a housing defining a housing interior and defining a ramp support surface. At least one disk is supported for rotation within the housing interior. A head gimbal assembly is supported within the housing interior for use in pivotally accessing the disk in performing one or more data accesses and for pivotally moving to an unloaded position from an access position. A ramp arrangement is configured for receiving the head gimbal assembly in the unloaded position. The ramp arrangement includes at least three feet for sliding engagement with the ramp support surface for use in at least partially establishing an operational position of the ramp arrangement in the housing.

In another aspect of the disclosure, a digital data storage apparatus includes a housing defining a housing interior and including a first surface and a second surface, both of which first and second surfaces are at least generally planar and in a transverse relationship with respect to one another. A disk is supported for rotation within the housing interior. A head gimbal assembly is supported within the housing interior for use in pivotally accessing the disk in performing one or more data accesses and for pivotally moving to an unloaded position from an access position. A ramp arrangement is configured for receiving the head gimbal assembly in the unloaded position. The ramp arrangement is configured for engaging the first surface and the second surface at least in part for establishing an operational position of the ramp arrangement in the housing interior.

In still another aspect of the disclosure, an apparatus is described for use in a hard disk drive. The hard disk drive includes a housing defining a housing interior, a disk supported for rotation within the housing interior and a head gimbal assembly supported within the housing interior for use in pivotally accessing the disk in performing one or more data accesses and for pivotally moving to an unloaded position from an access position. The apparatus includes a ramp arrangement that is configured for receiving the head gimbal assembly in the unloaded position. The ramp arrangement further includes at least three feet for sliding engagement with a ramp support surface, defined by the housing, for use in at least partially establishing an operational position of the ramp arrangement in said housing for supporting the head gimbal assembly in said unloaded position.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be illustrative rather than limiting.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology such as, for example, upper/lower, right/left, front/rear and the like has been adopted for purposes of enhancing the reader's understanding, with respect to the various views provided in the figures, and is in no way intended as being limiting.

Figure 1:
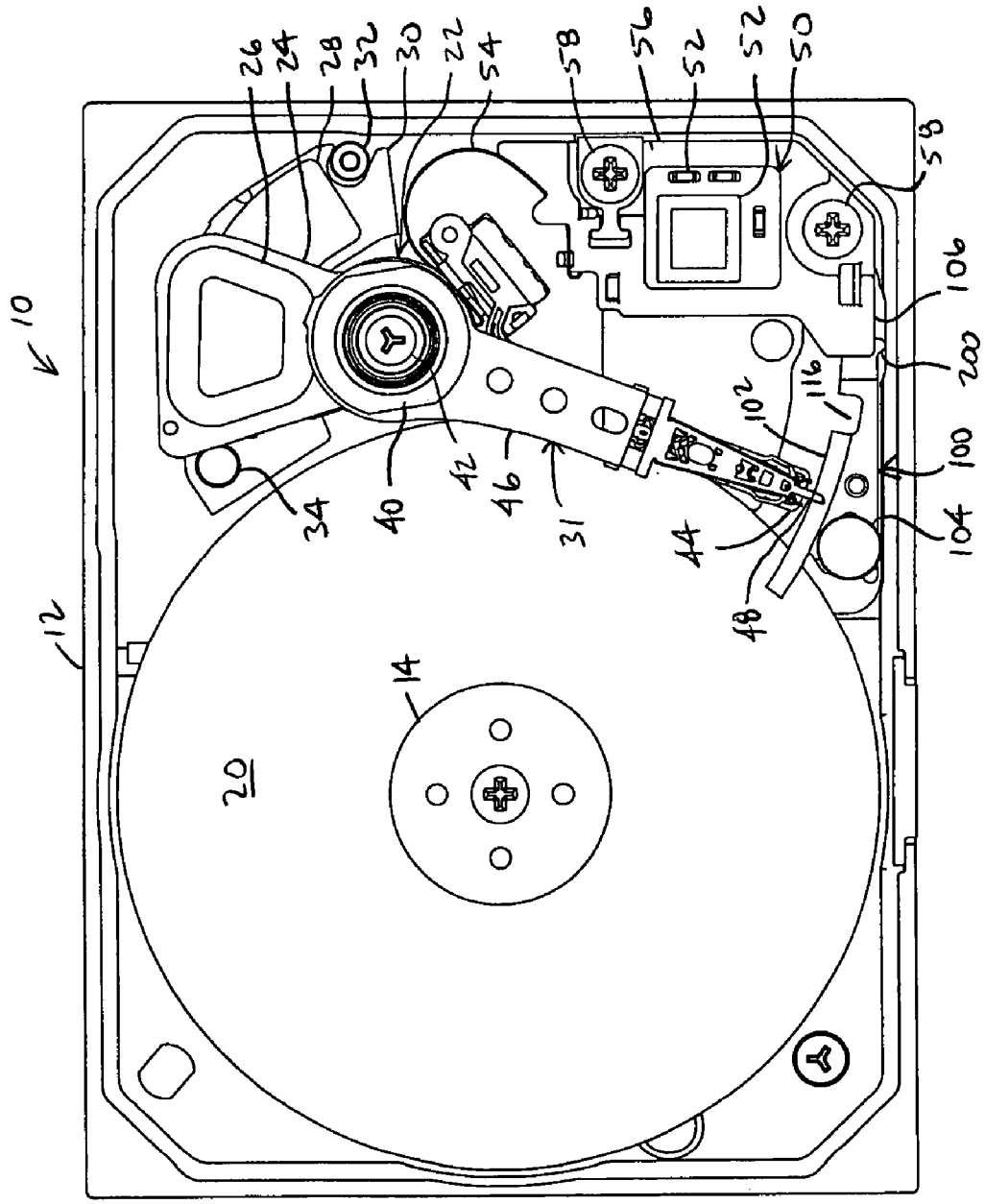
FIG. 1 is a diagrammatic, enlarged plan view of a hard disk drive that is produced in accordance with the present disclosure, having its cover removed for illustrative purposes.

Turning now to the figures, wherein like components are designated by like reference numbers whenever practical, attention is immediately directed to FIG. 1 which diagrammatically illustrates a hard disk drive, produced in accordance with the present disclosure, and generally indicated by the reference number 10. While drive 10 is a miniaturized hard disk drive produced by Cornice, Inc., of Longmont, Colo., and the teachings herein are considered to be highly advantageous with respect to accomplishing miniaturization of hard disk drive 10, it is to be appreciated that the concepts that have been brought to light herein are readily applicable with respect to any form factor hard disk drive.

Still referring to FIG. 1, drive 10 has been illustrated with its cover removed in order to show the various components which make up the drive. Drive 10 includes a base 12, supporting a spindle motor 14 for use in rotating a disk 20. It should be appreciated that the teachings herein are applicable to the use of multiple disks. Disk 20 includes opposing major upper and lower surfaces, each of which can be used to store digital data. A head stack assembly 22 (which may be referred to hereinafter as an HSA) includes a VCM end 24 having a voice coil 26 that is supported in a magnetic field defined by an assembly that is made up of a magnet 28, a lower return plate 30 and an upper return plate which is not shown in the present view for purposes of illustrative clarity. A Head Gimbal Assembly (HGA) 31 forms part of HSA 22, as will be further described. An inner diameter stop pin 32 and an outer diameter stop pin 34 serve to define rotational extents of travel of the HGA by engaging side margins of VCM end 24 at an inner diameter position and an outer diameter position, respectively, and further serve in conducting magnetic flux between lower return plate 30 and the upper return plate. Thus, voice coil 26 is supported in a magnetic field such that a controlled electric current in the voice coil can be used to selectively change the position of HGA 22. In this regard, the HSA includes a hub 40 that is pivotally supported by a pivot 42. A transducer arm arrangement, forming part of HGA 31, extends outward from hub 40, at least generally opposite VCM end 24, to a transducer arrangement 44. In the present example, a pair of transducer arms 46 is used such that a first transducer configuration, associated with an upper one of the arms performs data accesses using an upper surface (visible in FIG. 1) of disk 20, while a second transducer configuration, associated with a lower one of the arms, performs data accesses using a lower surface (not visible in FIG. 1) of disk 20. Generally, each transducer configuration comprises a slider which may support separate read and write transducers in a well known manner. A lift tab 48 extends from the distal end of each of the transducer arms. A flexible circuit assembly 50 supports a number of integrated circuits 52 and further includes flex extensions for interconnecting the various electrical components within drive 10, as well as for use in externally electrically interfacing the hard disk drive. One example of the aforementioned flex extensions comprises an HGA flex extension 54. This highly advantageous HGA flex extension and associated features are described in detail in copending U.S. patent application Ser. No. entitled ADVANCED MINIATURE HARD DISK DRIVE AND METHOD which shares the filing date of the present application and is incorporated herein by reference in its entirety. Flexible circuit assembly 50 is itself supported using a flex bracket 56 that is attached to base 12 using suitable fasteners 58 such as, for example, threaded fasteners, as will be described in more detail at an appropriate point below.

With continuing reference to FIG. 1, a latching arrangement (not shown) may be positioned proximate to VCM end 24 of HGA 22 for use in limiting the potential of the HGA with respect to rotating from an unloaded position to a loaded position in which the transducer configurations or sliders of transducer arrangement 44 come into contact with the data surfaces of disk 20 at an undesired time such as, for example, when the disk is not rotating. It is noted that latching arrangements are well known and that any suitable latching arrangement may be used, however, one highly advantageous latching arrangement is described in U.S. Pat. No. 5,404,257 entitled ROTARY INTERTIAL LATCH FOR DISK DRIVE ACTUATOR.

Figure 2:
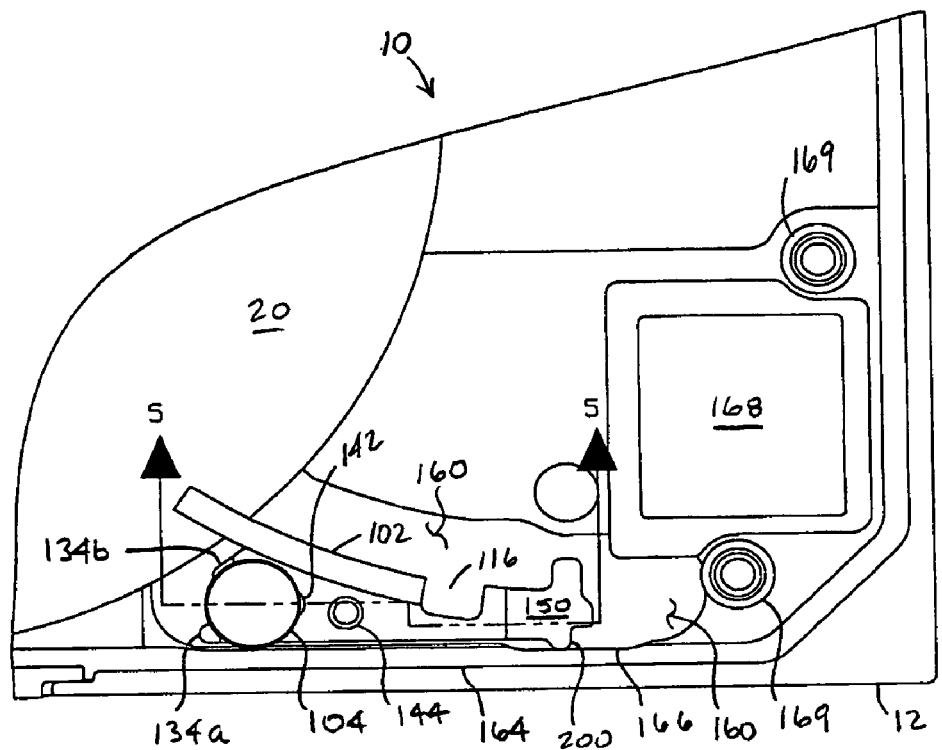
FIG. 2 is a further enlarged cut-away plan view of a portion of the hard disk drive of FIG. 1, shown here to illustrate details with respect to a highly advantageous ramp arrangement.
Figure 3:
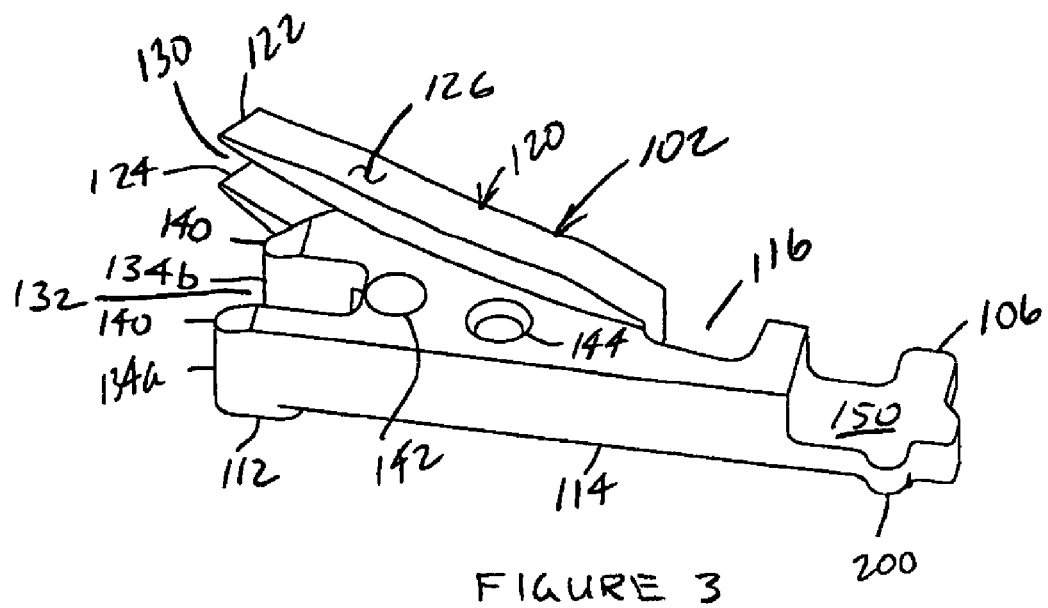
FIG. 3 is an enlarged perspective view of the ramp that is used in the hard disk drive of FIGS. 1 and 2, generally providing a view of the upper side of the ramp.
Figure 4:
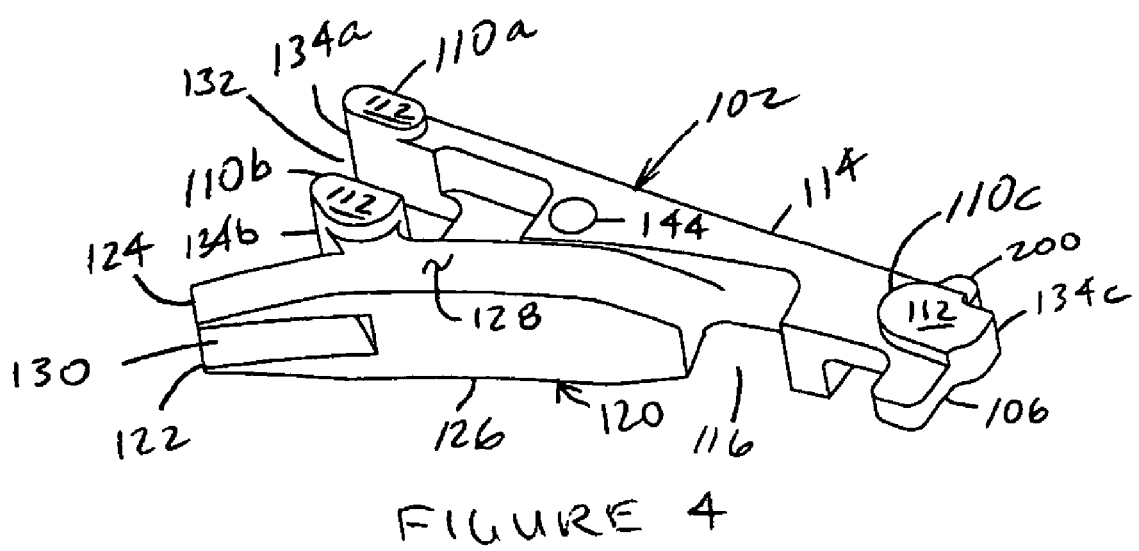
FIG. 4 is another enlarged perspective view of the ramp that is used in the hard disk drive of FIGS. 1 and 2, generally providing a view of the lower structure of the ramp.

Referring to FIGS. 1-4, a ramp arrangement 100 is illustrated including a ramp 102. FIG. 2 is a partially cutaway, further enlarged view of a portion of hard drive 10 showing ramp 102 in an installed condition, while FIGS. 3 and 4 are upper and lower perspective views, respectively, of ramp 102 in an uninstalled state and still further enlarged, shown here to illustrate details with respect to the structure of the ramp. Initially, it is noted that ramp arrangement 100 includes a T-post 104 and a second end portion 106 of flex bracket 56 for use in capturing ramp 102 in the operating position, as will be described below.

Referring primarily to FIGS. 3 and 4, ramp 102 includes at least three feet 100*a-c* which are best seen in FIG. 4 and may be referred to collectively as feet 110. The latter define a triangular region therebetween, although based on the use of different numbers of feet, differently shaped closed polygons will be defined. Each foot includes a contact surface 112 that may be at least generally planar in configuration, although this is not a requirement. A ramp body 114 extends between the feet such that contact surfaces 112 cooperatively define a plane that is spaced away from ramp body 114 in proximity thereto. Ramp body 114 further defines a notch 116 that can be located at least partially within the triangular region defined between the feet, as illustrated. For the moment, it is sufficient to note that notch 116 serves a specific purpose during drive assembly that is yet to be described. A ramp configuration 120 extends from ramp body 114 so as to form an upper ramp 122 and a lower ramp 124 defining an upper ramp surface 126 (FIG. 3) and a lower ramp surface 128 (FIG. 4), respectively. Distal ends of upper ramp 122 and lower ramp 124 cooperate to define a disk recess 130 therebetween, which is best seen in FIG. 4.

An indexing recess 132 is defined generally at one end of ramp body 114 between first and second extensions 134*a* and 134*b*, which may be referred to collectively as extensions 134, and which support feet 110*a* and 110*b*, respectively, generally on opposite sides of indexing recess 132. As will be described in further detail, each of extensions 134 includes a bevel 140 for use in assisting installation. Further, for purposes of assisting installation, a biasing bump 142 is provided proximate to indexing recess 130 on an upper surface of ramp body 114. A tooling aperture 144 is configured with a chamfer, proximate to the upper surface of the ramp body, for use in assisting in installation of the ramp in a way that will become evident in view of the discussions which follow. Further installation-related features include an engagement surface 150 (FIG. 3) that is formed proximate to a distal end of ramp body 114. Ramp 102 may be formed from any suitable material, using any suitable method, as will be appreciated by one having ordinary skill in the art in view of this overall disclosure. The ramp arrangement may be formed, for example, by molding using an appropriate technique, machining or any suitable combination thereof. For reasons which will become evident, tolerances of importance during and after installation of the ramp arrangement are established based, at least in part, on the positions of contact surfaces 112 in relation to ramp surfaces 126 and 128, along with other features of the ramp such as, for example, disk recess 130. In particular, Z height of the ramp is generally established using feet 110 in a highly advantageous way, as will be described hereinafter.

Figure 5:
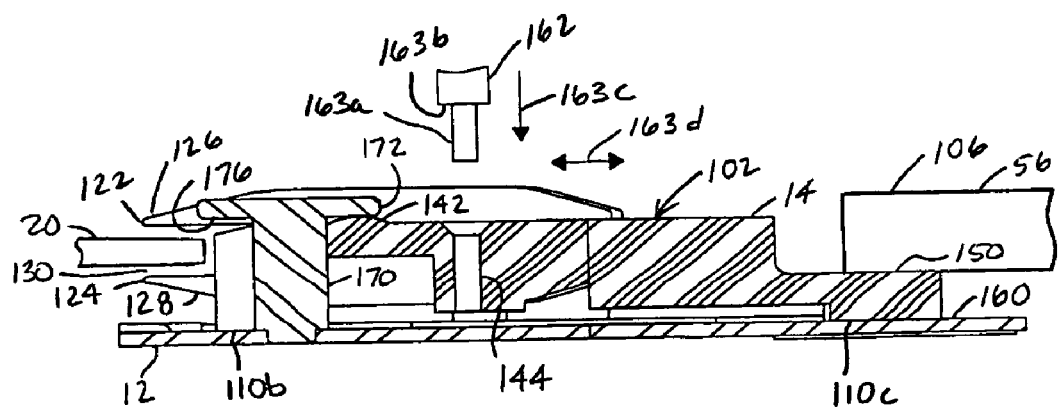
FIG. 5 is a diagrammatic cross-sectional view taken along a segmented line 5-5 through the ramp of FIG. 2, shown here to illustrate details with respect to the structure of the ramp and its relationship to a positioning tool, the rotatable data disk and the arrangement that is used for capturing the ramp in its operational position.

FIGS. 1, 2 and 5 illustrate ramp 102 in an installed condition within base 12. FIG. 5 is a cross-sectional view that has been limited to showing features primarily with respect to ramp arrangement 100, taken generally along a segmentary line 5-5 in FIG. 2 and showing an edge portion of disk 20 received in disk recess 130. As mentioned above, the ramp is captured in its operational position using a number of highly advantageous features. Initially, it is noted that base 12 defines a ramp support surface 160 in a bottom major panel of the base. Ramp support surface 160 includes a controlled tolerance for use in establishing the operational position of the ramp. Accordingly, tolerance characteristics of the ramp support surface can be established in view of tolerances that are required with respect to a desired operational position of the ramp. The lateral extents of ramp support surface 160 are established in view of the installation procedure that is employed for installation, as will be described below. Accordingly, the lateral extents of the ramp support surface are somewhat larger that what is required just to support the three feet of the ramp. The ramp support surface may be formed in any suitable manner including, but not limited to the use of machining, forming or casting. In this regard, it is noted that a machining step is typically required as part of the overall manufacture of base 12. Accordingly, additional machining can generally be performed to provide the ramp support surface at an incremental increase in manufacturing cost. A placement tool 162 is illustrated in a spaced apart relationship from ramp 102 for purposes of illustrative clarity. Tool 162 includes a tip 163a and a shoulder 163b such that tip 163a can be received in tooling aperture 144, by moving tool 162 in a direction 163c, that is indicated by an arrow. Tool 162 thereafter provides for lateral movement 163d of the ramp, as indicated by a double-headed arrow, with feet 110 slidingly engaging ramp support surface 160.

Still describing features with respect to base 12, primarily with reference to FIG. 2, a peripheral upstanding sidewall 164 delimits the bottom major panel of drive 10. For purposes which will be described below, sidewall 164 defines a biasing surface 166 which may be generally planar in lateral extent and transverse to ramp support surface 160. In one implementation, biasing surface 166 can be at least generally orthogonal with respect to ramp support surface 160. Like ramp support surface 160, biasing surface 166 can advantageously be provided using machining at nominal cost, although this is not a requirement and the biasing surface may be formed using any suitable expedient. In another embodiment, a feature such as, for example, a post may be utilized to substitute for the function of biasing surface 166.

Referring to FIGS. 2 and 5, it is noted that flexible circuit assembly 50 and flex bracket 56 have been removed in FIG. 2 to reveal an opening 168 that receives an electrical interface connector (not shown) that is supported by flexible circuit assembly 50 for use in externally interfacing drive 10, while only a cut-away portion of flex bracket 56 is shown in FIG. 5. Further, a pair of bosses 169 is shown for receiving fasteners 58 (see FIG. 1). Bosses 169 may comprise tubular bodies that are suitably affixed to base 12, for example, by welding. Aforementioned T-post 104 includes a post shaft 170 and a head 172. Post shaft 170 includes a distal end that is fixedly received in base 12, for example, by welding, although any attachment expedient may be utilized to maintain the position of post shaft 170 within a desired x-y tolerance on base 12. Head 172 may be separately formed and attached to shaft 170, for example, by welding, adhesives or using a fastener. A fastenerless attachment may be advantageous with respect to space utilization in a miniature drive. In one embodiment, T post 104 may be formed by machining or pressing. The T post can be formed using any suitable material and method, as will be appreciated by one having ordinary skill in the art in view of this overall disclosure. Head 172 defines a surface 176 which confronts base 12. In the present example, surface 176 is at least generally planar in configuration, having an outer edge that is at least somewhat rounded so as to facilitate ramp installation, which is yet to be described.

Figure 6:
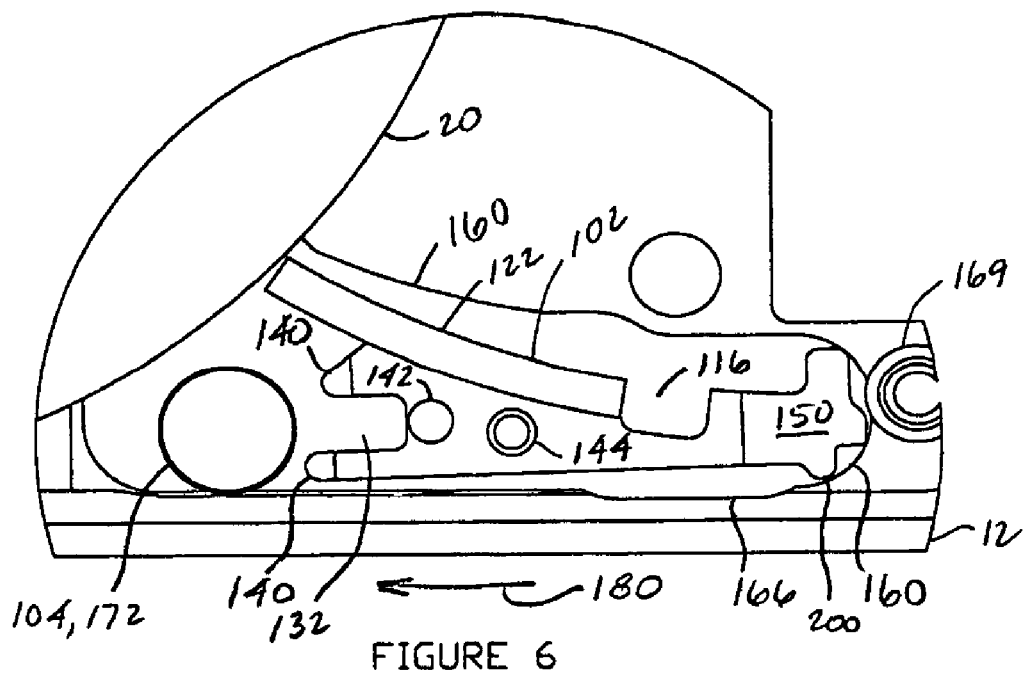
FIGS. 6 and 7 are diagrammatic cut-away plan views of the ramp region of the hard disk drive of FIG. 1, shown here to illustrate a highly advantageous ramp installation sequence.

Turning to FIG. 6 in view of FIGS. 3-5, and having described the physical structure of ramp arrangement 100, including its associated capture features supported by base 12 in detail above, attention is now directed to details with respect to the installation of ramp 102. FIG. 6 is a cut-away view of drive 10 showing the region which supports ramp 102. Initially, contact surfaces 112 of feet 110a-c are engaged against ramp support surface 160, for example, using placement tool 162 (FIG. 5) received in tooling aperture 144 such that the ramp is clear of disk 20, as shown in FIG. 6. HGA 22 of FIG. 1 is installed subsequent to the installation of the ramp. It should be appreciated that just engaging feet 110 against the ramp support surface establishes certain orientation parameters with respect to locating the ramp in the overall hard disk drive. For example, the Z height of all ramp features is established, along with pitch and roll orientation of these features, through the use of at least three ramp feet in cooperation with ramp support surface 160. For purposes of urging ramp feet 110 against ramp support surface 160, it should be mentioned that a downward, at least generally normally oriented biasing force, that is applied anywhere within the triangular region defined between feet 110, will serve to urge all three feet against the ramp support surface. Thus, tooling aperture 144 is located within this triangular region, such that a single tool is not only capable of slidingly moving feet 110 against the ramp support surface, but also simultaneously urging all three feet against support surface 160.

Continuing with a description of ramp installation, as the ramp feet are urged against ramp support surface 160, it should be appreciated that disk recess 130 (see FIGS. 3-5) of the ramp is vertically aligned with disk 20. That is, a desired clearance tolerance is established between the major surfaces of disk 20 and confronting surfaces of the ramp, within recess 130. As installation continues, engagement between the ramp feet and ramp support surface 160 is maintained as the ramp is slidingly moved against the ramp support surface in a direction that is indicated by an arrow 180 such that bevels 140 slide beneath post head 172 while post 144 (see FIG. 5) is received in indexing recess 132, as will be further described.

Figure 7:
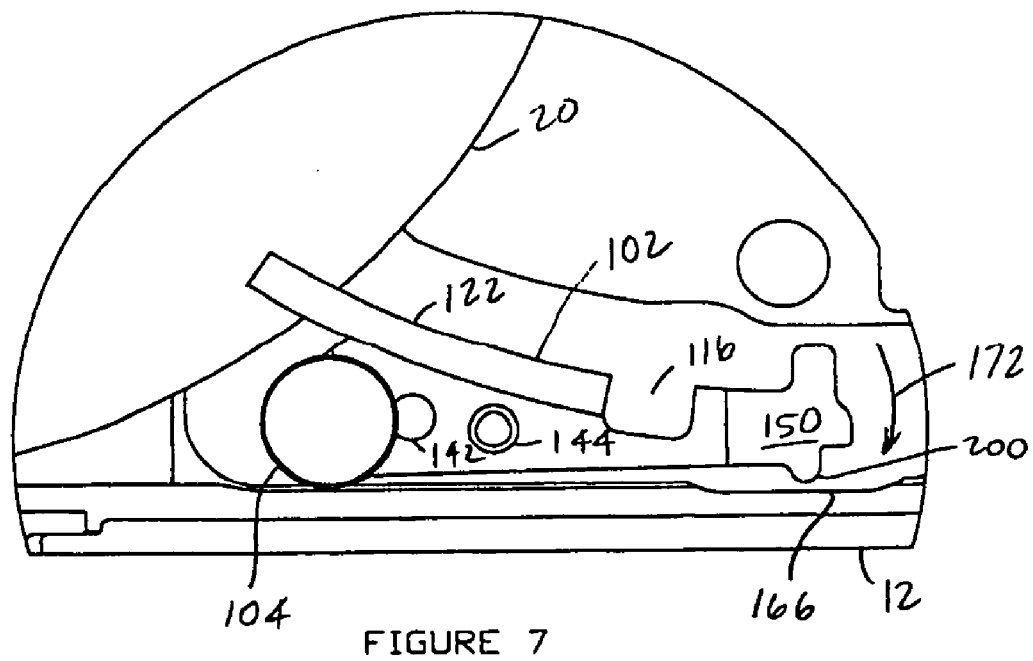

Turning to FIG. 7, ramp 102 is illustrated after having been moved into partial engagement with T-post 104 such that biasing bump 142 contacts lower surface 176 (FIG. 5) of post head 172. This contact serves to urge feet 110 against ramp support surface 160 in a highly advantageous way since the biasing bump is located within the triangular region defined by feet 110. Accordingly, a force is applied which serves to urge all three feet against the ramp support surface. During this motion, upper ramp 122 moves above the upper data surface of disk 20 while lower ramp 124 moves beneath the lower data surface of disk 20, as a desired clearance tolerance is maintained therebetween. Continuing motion in the direction of arrow 180 will cause post shaft 170 to be fully received in indexing recess 132 so as to, at least in part, establish a lateral position of one end of ramp 102. Subsequent rotation, as indicated by a curved arrow 172, of the ramp arrangement around post shaft 170, with the ramp arrangement biased or held thereagainst, serves to bring the ramp arrangement into a final, operational position, as feet 110 move slidingly against ramp support surface 160. More specifically, ramp 102 includes a positioning arm 200, which is also shown in earlier figures and may likewise be referred to as a locating tab, such that a final operating position of the ramp is established by rotating the ramp against T-post 104 until positioning arm 200 contacts biasing surface 166, as is shown in FIG. 2. It is noted that indexing recess 132 may have a width that provides a clearance fit of post shaft 170 therein or, in another embodiment, the indexing recess width can be less than the post width, such that a resilient bias is applied to the post shaft by indexing extensions 134. This resilient bias can be used for purposes of capturing the post shaft in the indexing recess. It is noted that ramp recess 130 is sufficiently deep so as to avoid contact with the edge of disk 20 throughout the installation procedure, even with the ramp in the position shown in FIG. 7, with the ramp somewhat rotated toward disk 20.

Referring to FIGS. 1 and 5, with ramp 102 held in its operational position, ramp installation is concluded by installing flexible circuit assembly 50 using fasteners 58 such that distal portion 106 of flexible circuit bracket 56 applies a downward force onto engagement surface 150 whereby to urge ramp foot 110c against ramp support surface 160. Accordingly, ramp 102 is captured in its operating position between T-post 104, ramp support surface 160, biasing surface 166, serving as an indexing stop, and end portion 106 of flex bracket 56. The ramp should be captured sufficiently tightly so as to ensure resistance to contemplated levels of mechanical shock and vibration. Applicant's testing has confirmed more than adequate performance with respect to mechanical shock and vibration.

Referring to FIG. 1, once the ramp has been installed, HGA 22 of FIG. 1 can be installed. As part of the installation procedure, lift tabs 48 are initially positioned in notch 116. Thereafter, in the view of FIG. 1, HGA 22 is rotated clockwise such that the lower lift tab engages lower ramp surface 128 (best seen in FIG. 4) and the upper lift tab engages upper ramp surface 126 (best seen in FIG. 3).

The captured ramp arrangement described herein is considered to be highly advantageous for a number of reasons. It can be integrally molded from a suitable material for use in a miniature drive with more than adequate molding tolerances and with no requirement for insert molding sleeves, metal reinforcements and the like. Such metal reinforcement features are not needed, since capture forces are well-controlled. Moreover, such features are difficult to employ at the molding scales contemplated for use in a miniature form factor drive, since the part is generally too small to readily support a metal insert. With respect to ramp positional tolerances, the use of a machined surface to support the three ramp feet is considered to be highly advantageous in and by itself, as described above. Further, installation of T-post 104 is straight-forward and its location is well-controlled using state-of-the-art technology. Cooperatively engaging the ramp support surface, T-post and biasing surface 166 establishes all tolerances with respect to the ramp operational position. Still further, the flex bracket represents an existing component that is now used in the added function of capturing the ramp arrangement.

At least the following concepts are considered to be enabled by the foregoing descriptions:

1. A digital data storage apparatus, comprising:
   a housing defining a housing interior and defining a ramp support surface;
   at least one disk supported for rotation within the housing interior;
   a head gimbal assembly supported within the housing interior for use in pivotally accessing the disk in performing one or more data accesses and for pivotally moving to an unloaded position from an access position; and
   a ramp arrangement that is configured for receiving the head gimbal assembly in said unloaded position, said ramp arrangement further including at least three feet for sliding engagement with said ramp support surface for use in at least partially establishing an operational position of the ramp arrangement in said housing.

2. The apparatus of claim 1 wherein a portion of said ramp arrangement, in an installed state, is in a confronting relationship with at least one data surface of said disk and said feet against said ramp support surface establish a controlled clearance between the data surface and the ramp arrangement in said confronting relationship.

3. The apparatus of claim 1 wherein said housing includes a base portion and a cover portion and wherein said base portion defines said ramp support surface.

4. The apparatus of claim 1 including a capture arrangement for capturing said ramp arrangement against said support surface to, at least in part, establish said operational position.

5. The apparatus of claim 4 wherein said feet cooperate to define a triangular shape and said capture arrangement includes a biasing configuration for applying a biasing force against said ramp arrangement to urge said feet into said ramp support surface such that the biasing force is applied within said triangular shape.

6. The apparatus of claim 1 wherein said ramp arrangement is configured for engaging an indexing arrangement, that is supported in said housing, such that the ramp arrangement is rotatable about the indexing arrangement with said feet in sliding engagement with the ramp support surface for use in establishing, at least in part, said operational position of said ramp arrangement.

7. The apparatus of claim 6 wherein said ramp arrangement includes a first end for engaging said indexing arrangement, said indexing arrangement including a post member attached to said housing and having an elongated length and said first end of the ramp arrangement defines an indexing recess for receiving at least a portion of the elongated length of said post member.

8. The apparatus of claim 7 wherein said post member supports a head that is wider than a width of the elongated length of the post member and said head cooperates with said first end of the ramp arrangement to urge said feet into said ramp support surface.

9. The apparatus of claim 8 wherein said head includes a biasing surface which faces said ramp support surface and said ramp arrangement includes a biasing bump for engaging said biasing surface to bias said feet into the ramp support surface.

10. The apparatus of claim 9 wherein said feet cooperatively define a triangular shape and said biasing bump is located for applying a ramp biasing force within said triangular shape.

11. The apparatus of claim 7 wherein said first end of the ramp arrangement includes a bifurcated configuration having a pair of indexing extensions for cooperatively defining said indexing recess and each one of said indexing extensions further serves to define one of said feet.

12. The apparatus of claim 11 wherein said post member includes a post width and said indexing recess is formed by said indexing extensions having an indexing recess width that is at least approximately equal to said post width.

13. The apparatus of claim 11 wherein said post member includes a post width and said indexing recess is formed by said indexing extensions having an indexing recess width that is less than said post width such that at least one of the indexing extensions applies a resilient bias to the post member.

14. The apparatus of claim 6 wherein said ramp arrangement includes a side margin at a second end thereof that is spaced apart from said first end for rotation of the side margin into an indexing stop, which forms part of said housing, such that said indexing stop cooperates with said side margin to establish, at least in part, said operational position of the ramp arrangement.

15. The apparatus of claim 14 wherein said housing includes a base portion having a peripheral sidewall which defines an indexing surface for engaging said side margin of the ramp arrangement as said indexing stop.

16. The apparatus of claim 15 wherein said indexing surface is transverse to said ramp support surface.

17. The apparatus of claim 6 wherein said feet cooperate to define a triangular region and said ramp arrangement includes a locating tab that is spaced apart from said indexing arrangement and projects outward from said triangular region for positioning in said housing in a way which, at least in part, establishes said operational position.

18. The apparatus of claim 17 wherein said disk drive includes a flexible circuit arrangement that is supported by a bracket and said bracket is mounted in said housing for capturing said locating tab against said housing.

19. The apparatus of claim 17 wherein said locating tab includes a side margin that is spaced apart from said indexing arrangement for rotation into an indexing stop, which forms part of said housing, such that said indexing stop cooperates with said side margin to establish, at least in part, said operational position of the ramp arrangement.

20. The apparatus of claim 1 wherein said head gimbal assembly includes a transducer end having at least one lift tab for engaging said ramp arrangement and wherein said feet cooperate to define a triangular region and said ramp arrangement defines a notch for use in receiving at least said lift tab as said head gimbal assembly is installed in said digital data storage arrangement.

21. The apparatus of claim 20 wherein said notch is at least partially within said triangular region.

22. The apparatus of claim 20 wherein said transducer arrangement includes a first lift tab and an opposing, second lift tab such that said notch provides for installing said head gimbal assembly with said first and second lift tabs supported on an opposing pair of ramp surfaces that are defined by the ramp arrangement.

23. The apparatus of claim 1 wherein said disk includes first and second opposing data surfaces and said head gimbal assembly is configured for accessing the first and second opposing data surfaces and said ramp arrangement includes a first ramp portion associated with said first data surface and a second ramp portion associated with said second data surface and said ramp arrangement is configured to maintain a clearance tolerance between the first data surface and the first ramp portion and between the second data surface and the second ramp portion as said feet slidingly engage said ramp support surface.

24. A method for producing a digital data storage apparatus, said method comprising:
providing a housing defining a housing interior and defining a ramp support surface;
supporting at least one disk for rotation within the housing interior;
mounting a head gimbal assembly within the housing interior for use in pivotally accessing the disk in performing one or more data accesses and for pivotally moving to an unloaded position from an access position; and
configuring a ramp arrangement for receiving the head gimbal assembly in said unloaded position and to include at least three feet for sliding engagement with said ramp support surface for use in at least partially establishing an operational position of the ramp arrangement in said housing.

25. The method of claim 24 wherein a portion of said ramp arrangement, in an installed state, is in a confronting relationship with at least one data surface of said disk and including urging said feet against said ramp support surface to establish a controlled clearance between the data surface and the ramp arrangement in said confronting relationship.

26. The method of claim 24 wherein said housing includes a base portion and a cover portion and said method includes using said base portion to define said ramp support surface.

27. The method of claim 24 including capturing said ramp arrangement against said support surface to, at least in part, establish said operational position.

28. The method of claim 27 including using said feet to cooperatively define a triangular shape and applying a biasing force against said ramp arrangement to urge said feet into said ramp support surface such that the biasing force is applied within said triangular shape.

29. The method of claim 24 including positioning an indexing arrangement in said housing and configuring said ramp arrangement for engaging the indexing arrangement such that the ramp arrangement is rotatable about the indexing arrangement with said feet in sliding engagement with the ramp support surface for use in establishing, at least in part, said operational position of said ramp arrangement.

30. The method of claim 29 including forming said ramp arrangement with a first end defining an indexing recess for engaging said indexing arrangement and providing a post member attached to said housing, as part of the indexing arrangement, and said post member having an elongated length that is at least partially receivable in said indexing recess.

31. The method of claim 29 including configuring said ramp arrangement with a side margin, at a second end thereof, that is spaced apart from said first end for rotation of the side margin into an indexing stop, which forms part of said housing, such that said indexing stop cooperates with said side margin to establish, at least in part, said operational position of the ramp arrangement.

32. The method of claim 31 including providing a base portion, as part of said housing, having a peripheral sidewall and defining an indexing surface in said peripheral sidewall for engaging said side margin of the ramp arrangement as said indexing stop.

33. The method of claim 32 including arranging said indexing surface transverse to said ramp support surface.

34. The method of claim 24 wherein said head gimbal assembly includes a transducer end having at least one lift tab for engaging said ramp arrangement and wherein said feet cooperate to define a triangular region and configuring said ramp arrangement to define a notch for use in receiving at least said lift tab as said head gimbal assembly is installed in said digital data storage arrangement such that the lift tab can thereafter be rotated into sliding engagement said ramp arrangement.

35. The method of claim 34 including forming said notch is at least partially within said triangular region.

36. The method of claim 24 wherein said disk includes first and second opposing data surfaces and said head gimbal assembly is configured for accessing the first and second opposing data surfaces and configuring said ramp arrangement to include a first ramp portion associated with said first data surface and a second ramp portion associated with said second data surface to maintain a clearance tolerance between the first data surface and the first ramp portion and between the second data surface and the second ramp portion as said feet slidingly engage said ramp support surface.

37. A digital data storage apparatus, comprising:
 a housing defining a housing interior and including a first surface and a second surface, both of which first and second surfaces are at least generally planar and in a transverse relationship with respect to one another;
 a disk supported for rotation within the housing interior;
 a head gimbal assembly supported within the housing interior for use in pivotally accessing the disk in performing one or more data accesses and for pivotally moving to an unloaded position from an access position; and
 a ramp arrangement that is configured for receiving the head gimbal assembly in said unloaded position, said ramp arrangement configured for engaging said first surface and said second surface at least in part for establishing an operational position of the ramp arrangement in said housing interior.

38. The apparatus of claim 37 wherein said housing includes a base portion and a cover portion and said base portion defines said first surface and said second surface.

39. The apparatus of claim 38 wherein said second surface is at least approximately orthogonal with respect to said first surface.

40. The apparatus of claim 38 wherein said base portion includes a housing floor that is delimited by a peripheral, upstanding sidewall and said housing floor defines said first surface and said peripheral sidewall defines said second surface.

41. The apparatus of claim 37 wherein said first surface and said second surface are located in said housing within a controlled tolerance from a target positional relationship with respect to one another and the housing.

42. The apparatus of claim 37 wherein said ramp arrangement includes at least three feet for sliding engagement with said first surface for use in at least partially establishing said operational position of the ramp arrangement in said housing.

43. The apparatus of claim 42 wherein said feet cooperate to define a triangular shape and said apparatus includes a biasing configuration for applying a biasing force against said ramp arrangement within said triangular shape to urge said feet into said ramp support surface.

44. The apparatus of claim 37 wherein said ramp arrangement is configured for rotation with said feet in sliding engagement with the first surface such that an indexing portion of the ramp arrangement engages said second surface for use in establishing, at least in part, said operational position of said ramp arrangement.

45. A method for producing a digital data storage apparatus, said method comprising:
 providing a housing defining a housing interior and including a first surface and a second surface, both of which first and second surfaces are at least generally planar and in a transverse relationship with respect to one another;
 supporting at least one disk for rotation within the housing interior;
 mounting a head gimbal assembly within the housing interior for use in pivotally accessing the disk in performing one or more data accesses and for pivotally moving to an unloaded position from an access position; and
 configuring a ramp arrangement for receiving the head gimbal assembly in said unloaded position and for said first surface and said second surface at least in part for establishing an operational position of the ramp arrangement in said housing interior.

46. The method of claim 45 wherein said second surface is at least approximately orthogonal with respect to said first surface.

47. The method of claim 45 including configuring said ramp arrangement with at least three feet for sliding engagement with said first surface for use in at least partially establishing said operational position of the ramp arrangement in said housing.

48. The method of claim 47 wherein said feet cooperate to define a triangular shape and applying a biasing force against said ramp arrangement within said triangular shape to urge said feet into said ramp support surface for use in establishing said operational position.

49. For use in a hard disk drive including a housing defining a housing interior, a disk supported for rotation within the housing interior and a head gimbal assembly supported within the housing interior for use in pivotally accessing the disk in performing one or more data accesses and for pivotally moving to an unloaded position from an access position, an apparatus, comprising:
 a ramp arrangement that is configured for receiving the head gimbal assembly in said unloaded position, said ramp arrangement further including at least three feet for sliding engagement with a ramp support surface, defined by said housing, for use in at least partially establishing an operational position of the ramp arrangement in said housing for supporting the head gimbal assembly in said unloaded position.

Although each of the aforedescribed physical embodiments have been illustrated with various components having particular respective orientations, it should be understood that the present invention may take on a variety of specific configurations with the various components being located in a wide variety of positions and mutual orientations. Furthermore, the methods described herein may be modified in an unlimited number of ways, for example, by reordering the various sequences of which they are made up. Accordingly, having described a number of exemplary aspects and embodiments above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A digital data storage apparatus, comprising:
   a housing defining both a housing interior and a ramp support surface;
   at least one a disk supported for rotation within the housing interior;
   a head gimbal assembly supported within the housing interior for use in pivotally accessing the disk in performing one or more data accesses and for pivotally moving the head gimbal assembly to an unloaded position from an access position;
   a ramp arrangement that is configured for receiving the head gimbal assembly in said unloaded position, said ramp arrangement including at least three feet defining a triangular shape for sliding engagement with said ramp support surface for use in at least partially establishing an operational position of the ramp arrangement in said housing; and
   a capture arrangement positioned within said triangular shape and applying a biasing force to the ramp arrangement for capturing said ramp arrangement between the capture arrangement and said ramp support surface.

2. The apparatus of claim 1 wherein a portion of said ramp arrangement, in an installed state, is in a confronting relationship with at least one data surface of said disk and said feet against said ramp support surface establish a controlled clearance between the data surface and the ramp arrangement in said confronting relationship.

3. The apparatus of claim 1 wherein said housing includes a base portion and a cover portion and wherein said base portion defines said ramp support surface.

4. The apparatus of claim 1 wherein said capture arrangement include an indexing arrangement, that is supported in said housing, such that the ramp arrangement is rotatable about the indexing arrangement with said feet in sliding engagement with the ramp support surface for use in establishing, at least in part, said operational position of said ramp arrangement.

5. The apparatus of claim 4 wherein said ramp arrangement includes a first end for engaging said indexing arrangement, said indexing arrangement including a post member attached to said housing and having an elongated length and said first end of the ramp arrangement defines an indexing recess for receiving at least a portion of the elongated length of said post member.

6. The apparatus of claim 5 wherein said post member supports a head that is wider than a width of the elongated length of the post member and said head cooperates with said first end of the ramp arrangement to urge said feet into said ramp support surface.

7. The apparatus of claim 6 wherein said head includes a biasing surface which faces said ramp support surface and said ramp arrangement includes a biasing bump for engaging said biasing surface to bias said feet into the ramp support surface.

8. The apparatus of claim 7 wherein said biasing bump is located for applying a ramp biasing force within said triangular shape.

9. The apparatus of claim 5 wherein said first end of the ramp arrangement includes a bifurcated configuration having a pair of indexing extensions for cooperatively defining said indexing recess and each one of said indexing extensions further serves to define one of said feet.

10. The apparatus of claim 9 wherein said post member includes a post width and said indexing recess is formed by said indexing extensions having an indexing recess width that is at least approximately equal to said post width.

11. The apparatus of claim 9 wherein said post member includes a post width and said indexing recess is formed by said indexing extensions having an indexing recess width that is less than said post width such that at least one of the indexing extensions applies a resilient bias to the post member.

12. The apparatus of claim 4 wherein cooperate to define said ramp arrangement includes a locating tab that is spaced apart from said indexing arrangement and projects outward from said triangular region for positioning in said housing in a way which, at least in part, establishes said operational position.

13. The apparatus of claim 12 wherein said disk drive includes a flexible circuit arrangement that is supported by a bracket and said bracket is mounted in said housing for capturing said locating tab against said housing.

14. The apparatus of claim 12 wherein said locating tab includes a side margin that is spaced apart from said indexing arrangement for rotation into an indexing stop, which forms part of said housing, such that said indexing stop cooperates with said side margin to establish, at least in part, said operational position of the ramp arrangement.

15. The apparatus of claim 1 wherein said head gimbal assembly includes a transducer end having at least one lift tab for engaging said ramp arrangement and said ramp arrangement defines a notch for use in receiving at least said lift tab as said head gimbal assembly is installed in said digital data storage arrangement.

16. The apparatus of claim 15 wherein said notch is at least partially within said triangular region.

17. The apparatus of claim 15 wherein said transducer arrangement includes a first lift tab and an opposing, second lift tab such that said notch provides for installing said head gimbal assembly with said first and second lift tabs supported on an opposing pair of ramp surfaces that are defined by the ramp arrangement.

18. The apparatus of claim 1 wherein said disk includes first and second opposing data surfaces and said head gimbal assembly is configured for accessing the first and second opposing data surfaces and said ramp arrangement includes a first ramp portion associated with said first data surface and a second ramp portion associated with said second data surface and said ramp arrangement is configured to maintain a clearance tolerance between the first data surface and the first ramp portion and between the second data surface and the second ramp portion as said feet slidingly engage said ramp support surface.

19. A method for producing a digital data storage apparatus, said method comprising:
   providing a housing defining both a housing interior and a ramp support surface;
   supporting a disk for rotation within the housing interior;
   mounting a head gimbal assembly within the housing interior for use in pivotally accessing the disk in performing one or more data accesses and for pivotally moving the head gimbal assembly to an unloaded position from an access position;
   configuring a ramp arrangement for receiving the head gimbal assembly in said unloaded position and to include at least three feet defining a triangular shape for sliding engagement with said ramp support surface for use in at least partially establishing an operational position of the ramp arrangement in said housing; and
   capturing the ramp arrangement by applying a biasing force to the ramp arrangement within said triangular shape for capturing said ramp arrangement against said ramp support surface.

20. A digital data storage apparatus, comprising;
- a housing defining a housing interior and including a first surface and a second surface, both of which first and second surfaces are at least generally planar and in a transverse relationship with respect to one another;
- a disk supported for rotation within the housing interior;
- a head gimbal assembly supported within the housing interior for use in pivotally accessing the disk in performing one or more data accesses and for pivotally moving to an unloaded position from an access position; and
- a ramp arrangement that is configured for receiving the head gimbal assembly in said unloaded position, said ramp arrangement configured for engaging said first surface and said second surface at least in part for establishing an operational position of the ramp arrangement in said housing interior.

21. The apparatus of claim 20 wherein said housing includes a base portion and a cover portion and said base portion defines said first surface and said second surface.

22. The apparatus of claim 21 wherein said second surface is at least approximately orthogonal with respect to said first surface.

23. The apparatus of claim 21 wherein said base portion includes a housing floor that is delimited by a peripheral, upstanding sidewall and said housing floor defines said first surface and said peripheral sidewall defines said second surface.

24. The apparatus of claim 20 wherein said ramp arrangement is configured for rotation with said feet in sliding engagement with the first surface such that an indexing portion of the ramp arrangement engages said second surface for use in establishing, at least in part, said operational position of said ramp arrangement.

25. An apparatus for use in a hard disk drive including a housing defining a housing interior, a disk supported for rotation within the housing interior, and a head gimbal assembly supported within the housing interior for use in pivotally accessing the disk in performing one or more data accesses and for pivotally moving to an unloaded position from an access position, the apparatus, comprising:
- a ramp arrangement that is configured for receiving the head gimbal assembly in said unloaded position, said ramp arrangement including
  - at least three feet defining a triangle for sliding engagement with a ramp support surface, defined by said housing, for use in at least partially establishing an operational position of the ramp arrangement in said housing for supporting the head gimbal assembly in said unloaded position; and
  - an indexing recess positioned within the triangle for receiving at least a portion of a post member secured to the housing.

* * * * *

UNITED STATES PATENT AND TRADEMARK OFFICE
CERTIFICATE OF CORRECTION

PATENT NO.       : 7,593,192 B1                                          Page 1 of 1
APPLICATION NO.  : 11/385955
DATED            : September 22, 2009
INVENTOR(S)      : Rappel et al.

It is certified that error appears in the above-identified patent and that said Letters Patent is hereby corrected as shown below:

Title Page
(54) Title, change "ARRANGEMENTS" to --ARRANGEMENT--

Column 1
Line 1, change "ARRANGEMENTS" to --ARRANGEMENT--

Column 13
Line 5, delete "at least one"
Line 33, change "include" to --includes--

Column 14
Line 7, delete "cooperate to define"

Column 15
Line 1, change "comprising;" to --comprising:--
Line 10, delete "and"
Line 16, change "interior." to --interior, the ramp arrangement including at least three feet defining a triangular shape, the at least three feet engaging said first surface; and a capture arrangement positioned within said triangular shape and applying a biasing force to the ramp arrangement for capturing said ramp arrangement between the capture arrangement and said ramp support surface.--

Column 16
Line 16, change "including" to --including:--

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,593,192 B1  Page 1 of 1
APPLICATION NO. : 11/385955
DATED : September 22, 2009
INVENTOR(S) : Rappel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 763 days.

Signed and Sealed this

Twenty-first Day of September, 2010

David J. Kappos
*Director of the United States Patent and Trademark Office*